US012289033B2

United States Patent
Hofer et al.

(10) Patent No.: US 12,289,033 B2
(45) Date of Patent: Apr. 29, 2025

(54) MOTOR ASSEMBLY

(71) Applicant: BRP-ROTAX GMBH & CO. KG, Gunskirchen (AT)

(72) Inventors: Gerhard Hofer, Hochneukirchen (AT); Sebastian Igel, Vienna (AT); Gereon Pusch, Traiskirchen (AT); Wolfgang Schweiger, St. Stefan (AT); Martin Bloder, Sinabelkirchen (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 0 days.

(21) Appl. No.: 18/818,772

(22) Filed: Aug. 29, 2024

(65) Prior Publication Data

US 2025/0079934 A1 Mar. 6, 2025

Related U.S. Application Data

(60) Provisional application No. 63/535,706, filed on Aug. 31, 2023.

(51) Int. Cl.
*H02K 7/116* (2006.01)
*F16H 1/28* (2006.01)
(Continued)

(52) U.S. Cl.
CPC ............... *H02K 7/116* (2013.01); *F16H 1/28* (2013.01); *F16H 55/06* (2013.01)

(58) Field of Classification Search
CPC .......... H02K 7/006; H02K 7/114; F16H 1/28; F16H 2200/2005; F16H 3/72; B60K 1/02
See application file for complete search history.

(56) References Cited

U.S. PATENT DOCUMENTS

| 4,691,119 | A | 9/1987 | McCabria |
| 2003/0232678 | A1* | 12/2003 | Yamauchi ............... F16H 3/728 |
| | | | 903/910 |

(Continued)

FOREIGN PATENT DOCUMENTS

| DE | 102019203854 A1 | 9/2020 | |
| EP | 3104503 A1 * | 12/2016 | ............. F16H 55/18 |

(Continued)

OTHER PUBLICATIONS

European Search Report issued on Feb. 19, 2025, during the prosecution of corresponding European application No. 24197537.4, 3 pages.

*Primary Examiner* — Ernesto A Suarez
*Assistant Examiner* — Lillian T Nguyen
(74) *Attorney, Agent, or Firm* — BCF LLP

(57) ABSTRACT

A motor assembly including an annulus gear including an annulus gear body having a hollow cylindrical form, and a plurality of annulus gear teeth disposed on an inner surface of the annulus gear body; at least one first outrunner motor disposed in an interior of the annulus gear, the at least one first motor being arranged to drive the annulus gear; a carrier disposed at least partially in the interior of the annulus gear, the carrier including a plurality of carrier gears rotationally connected to the carrier body, the carrier gears being engaged with the annulus gear; a center gear disposed in the interior of the annulus gear, the carrier gears being engaged with the center gear; and at least one second outrunner motor disposed in the interior of the annulus gear, the at least one second motor being arranged to drive the center gear.

18 Claims, 12 Drawing Sheets

(51) Int. Cl.
    *F16H 3/72*         (2006.01)
    *F16H 55/06*      (2006.01)

(56) References Cited

U.S. PATENT DOCUMENTS

| | | | |
|---|---|---|---|
| 2022/0154804 A1* | 5/2022 | Klassen | F16H 57/02 |
| 2022/0212528 A1* | 7/2022 | Corn | H02K 7/08 |

FOREIGN PATENT DOCUMENTS

| | | | |
|---|---|---|---|
| ES | 2364114 A1 | 8/2011 | |
| IT | 201800005221 A1 | 11/2019 | |

* cited by examiner

MOTOR ASSEMBLY

CROSS-REFERENCE

The present application claims priority to U.S. Provisional Patent Application No. 63/535,706, entitled "Motor Assembly", filed Aug. 31, 2023, the entirety of which is incorporated by reference herein.

FIELD OF TECHNOLOGY

The present technology relates to electric motor assemblies.

BACKGROUND

Electric vehicle production is increasing, with vehicles of many types being designed or adapted to be electrically powered, including for transport and recreation. Different types of vehicles, and even different models of the same type of vehicle, often have different torque, speed, and power requirements.

The electric powertrain for many different vehicles could thus requires a motor specifically designed for that application. Development and testing may be elaborate, both incurring cost and time before the vehicle can be brought to market.

Therefore, there remains a desire for electric motors or motor assemblies for a variety of applications.

SUMMARY

It is an object of the present technology to ameliorate at least some of the inconveniences present in the prior art.

According to some aspects of the present technology, there is provided an electric motor assembly combining electric motors with a particular planetary drive to provide an electrically powered drive shaft with a very flexible torque and speed output. In the illustrated embodiment, there are four identical motors that are capable of relatively high speeds (10,000 RPM or more). Two of these motors are operatively connected to a center gear, often referred to as a sun gear, with the other two motors being operatively connected to an exterior gear, often referred to as a ring or annulus gear. A set of planetary gears, supported by a carrier, connects sun gear and ring gear, with the planet gear carrier providing an output shaft. In this configuration, depending on the speed and direction of rotation of the individual motors, their power or torque can be added (with some limitations). For example, it is possible to rotate the output shaft at low speed and high torque, which allows for a smooth launch of the vehicle. The motors are outrunner motors, i.e. with the rotor on the outside. As such, the motor gears can be press-fit or otherwise mounted on the outside and the motors are therefore disposed inside the planetary gear assembly, thus providing a compact assembly. Further, with long contact regions between the gears, this arrangement provides a low pressure between teeth of the different gears, allowing the gears to be formed of plastic in at least some embodiments.

According to an aspect of the present technology, there is provided a motor assembly including an annulus gear including an annulus gear body having a hollow cylindrical form, and a plurality of annulus gear teeth disposed on an inner surface of the annulus gear body, the annulus gear rotating about a center rotation axis; at least one first motor disposed in an interior of the annulus gear, the at least one first motor being an outrunner electric motor rotating about a first motor axis, the first motor axis being parallel to the center rotation axis, the at least one first motor being arranged to drive the annulus gear; a carrier disposed at least partially in the interior of the annulus gear. The carrier includes a carrier body defining an output shaft, and a plurality of carrier gears rotationally connected to the carrier body, gear teeth of the plurality of carrier gears being engaged with the plurality of annulus gear teeth; a center gear disposed in the interior of the annulus gear, the center gear including a center gear body, and a plurality of center gear teeth disposed on an outer surface of the center gear body, a rotation axis of the center gear being coaxial with the center rotation axis, the gear teeth of the plurality of carrier gears being engaged with the plurality of center gear teeth; and at least one second motor disposed in the interior of the annulus gear, the at least one second motor being an outrunner electric motor rotating about a second motor axis, the second motor axis being parallel to the center rotation axis, the at least one second motor being arranged to drive the center gear.

In some embodiments, an outer surface of the at least one first motor having a plurality of first gear teeth, the plurality of first gear teeth being engaged with the plurality of annulus gear teeth; and an outer surface of the at least one second motor having a plurality of second gear teeth, the plurality of second gear teeth being engaged with plurality of center gear teeth.

In some embodiments, when in use, rotation of the at least one first motor causes rotation of the annulus gear; and rotation of the at least one second motor causes rotation of the center gear.

In some embodiments, the at least one first motor includes a first ring motor engaged with the annulus gear; and a second ring motor engaged with the annulus gear.

In some embodiments, the first ring motor and the second ring motor are oppositely disposed about the center gear.

In some embodiments, the at least one second motor includes a first hub motor engaged with the center gear; and a second hub motor engaged with the center gear.

In some embodiments, the first ring motor, the second ring motor, the first hub motor, and the second hub motor are disposed around the center gear.

In some embodiments, the first ring motor is disposed angularly between the first hub motor and the second hub motor; and the second ring motor is disposed angularly between the second hub motor and the first hub motor.

In some embodiments, the motor assembly further includes a support frame; and the annulus gear is arranged to freely rotate relative to the support frame, and a center position of the at least one first motor and a center position the at least one second motor is fixed relative to the support frame.

In some embodiments, the annulus gear is surrounded by the support frame; and the output shaft of the carrier extends through and out of the support frame.

In some embodiments, the support frame includes a bearing, the output shaft extending through and being supported by the bearing.

In some embodiments, a stator shaft of the at least one first motor is rotationally fixed relative to the support frame; and a stator shaft of the at least one second motor is rotationally fixed relative to the support frame.

In some embodiments, the stator shaft of the at least one first motor extends through at least one first opening in the support frame, the support frame preventing movement of the center position of the at least one first motor at least in part by contact of the stator shaft with the at least one first opening; and the stator shaft of the at least one second motor extends through at least one second opening in the support frame, the support frame preventing movement of the center position of the at least one second motor at least in part by contact of the stator shaft with the at least one second opening.

In some embodiments, the plurality of carrier gears includes three carrier gears.

In some embodiments, the plurality of first gear teeth is formed from plastic; and the plurality of second gear teeth is formed from plastic.

In some embodiments, the at least one first motor is a plurality of ring motors engaged with the annulus gear; and the at least one second motor is a plurality of hub motors engaged with the center gear.

Embodiments of the present technology each have at least one of the above-mentioned aspects, but do not necessarily have all of them.

Additional and/or alternative features, aspects, and advantages of embodiments of the present technology will become apparent from the following description, the accompanying drawings, and the appended claims.

Figure 1:
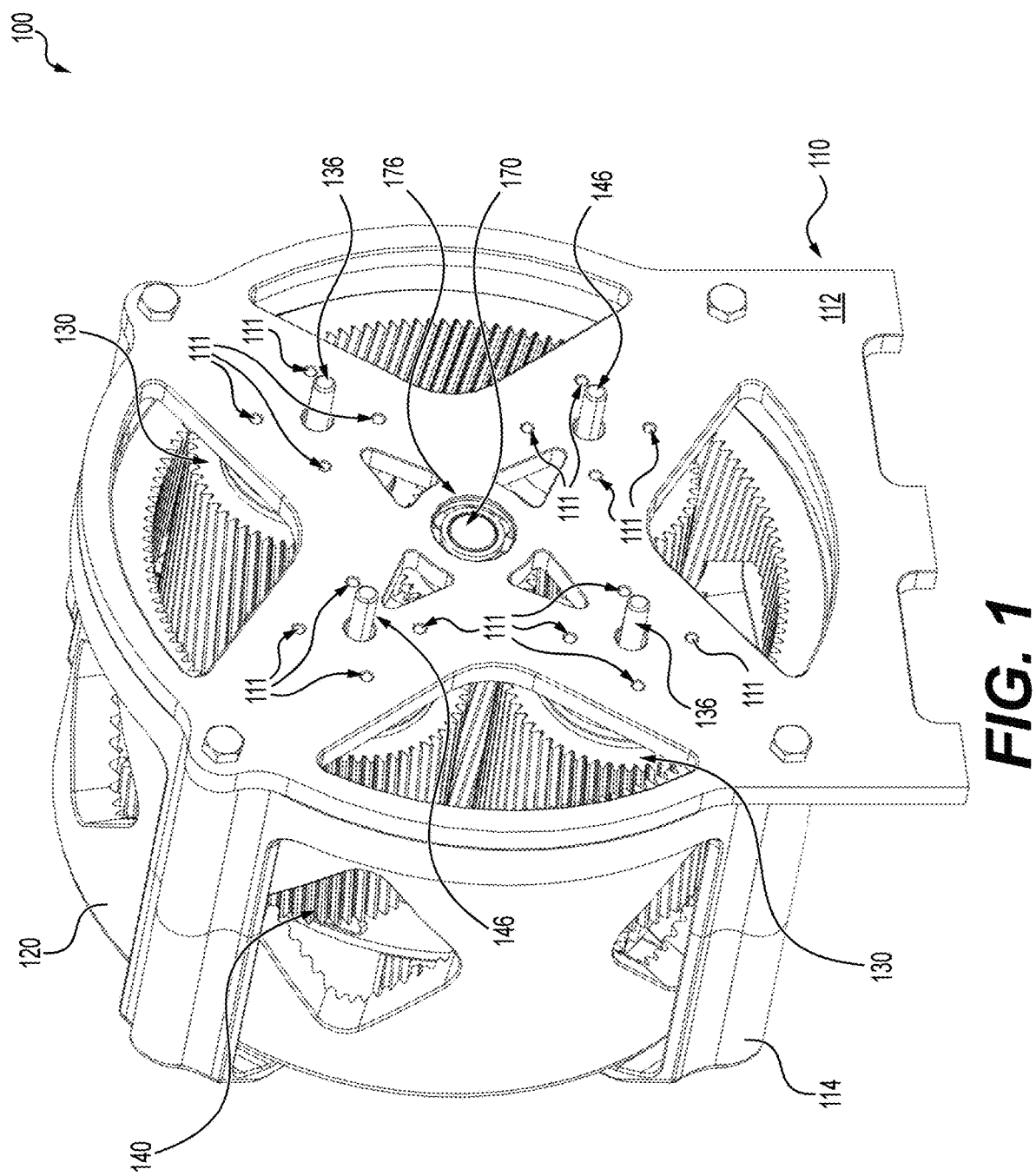
FIG. 1 is a front, side perspective view of a motor assembly according to one non-limiting embodiment of the present technology.
Figure 2:
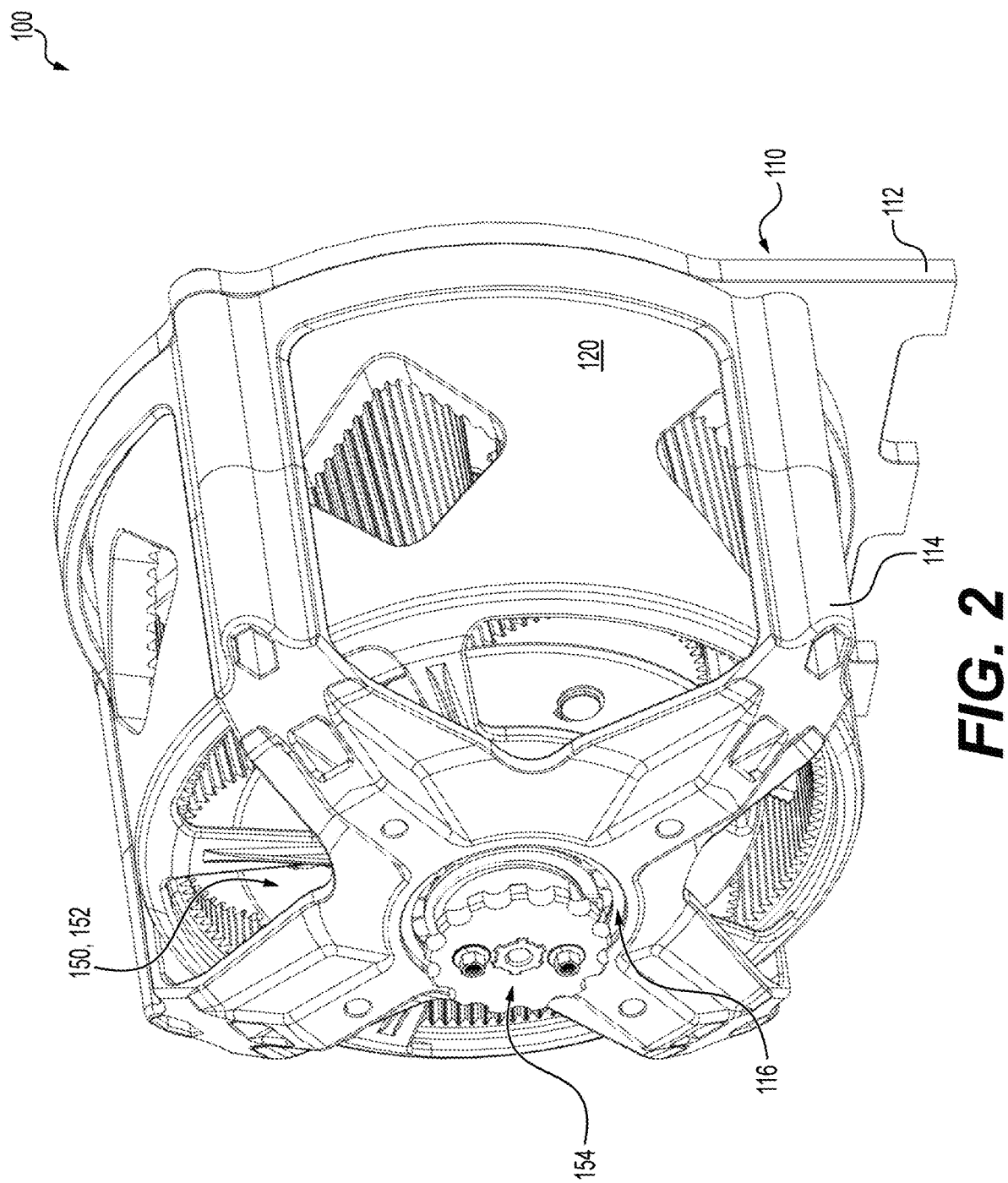
FIG. 2 is a rear, side perspective view of the motor assembly of FIG. 1.

It should be noted that the Figures may not be drawn to scale.

DETAILED DESCRIPTION

The present technology of a motor assembly 100 is generally described herein for use in vehicles, including but not limited to recreational vehicles such as motorcycles, scooters, karts, snowmobiles, and off-road vehicles. It is also contemplated that the motor assembly 100, at least in some embodiments, could be configured and arranged to drive other apparatuses, such as power equipment, including but not limited to heavy machinery, pumps, and lawnmowers.

For purposes of this application, terms related to spatial orientation when referring to the motor assembly 100 such as front, rear, left, and right are assigned herein for ease of explanation and understanding, but are not meant to limit the orientation of the motor assembly 100 when implemented in a vehicle or other apparatus.

Broadly, the motor assembly 100 includes electric outrunner motors and an epicyclic gear drive. The outrunner motors are located within the gear drive to increase contact between the motors and their corresponding gears and decrease an overall volume of the system. The epicyclic gear drive combines the speed and torque of the motors, providing a flexible powering arrangement suitable for a variety of different electric gear trains. The motor assembly 100 could thus be used in many different vehicles and/or apparatuses.

With reference to FIGS. 1 to 5, the motor assembly 100, also referred to as the assembly 100, includes a support frame 110 for supporting the motor and gear components disposed therein, also referred to as a subassembly 102 (described below) of the assembly 100. The frame 110 is configured to connected to motor mounts (not shown) when installed in a vehicle or other apparatus. In the illustrated embodiment, the support frame 110 includes a faceplate 112 and a cage 114 connected thereto. As will be described in more detail below, the cage 114 includes a bearing 116 for supporting an output shaft 154. In different embodiments, the frame could be formed by a larger structure, such as part of a vehicle frame or a swing arm of a motorcycle or three-wheeled straddle seat vehicle.

The subassembly 102, broadly the components of the assembly 100 that are supported by the support frame 110, is additionally illustrated in FIGS. 6 to 10. The assembly 100/subassembly 102 includes an exterior gear 120, commonly referred to as an annulus gear 120, disposed between the faceplate 112 and the cage 114. The annulus gear 120 includes an annulus gear body 122 with a hollow cylindrical form, further illustrated in FIG. 11. The annulus gear 120 includes a plurality of annulus gear teeth 124 disposed on an inner surface of the annulus gear body 120 for engaging with other gears of the assembly 100 (described below). In the present embodiment, the annulus gear 120 further includes a rear support structure 126 and a bearing 128 connected to the rear support structure 126 (use thereof is described below). When in use, the annulus gear 120 rotates about a center rotation axis 101 (see FIG. 4) of the assembly 100.

The assembly 100 includes one or more electric motors 130 for driving rotation of the annulus gear 120, referred to herein as ring motors 130. In the present embodiment, two ring motors 130 are disposed in an interior of the annulus gear 120 and the support frame 110. It is contemplated that in some embodiments, only one ring motor 130 may be included. It is also contemplated that more than two motors 130 could be included.

The ring motors 130 are specifically two outrunner electric motors 130. A main body 132 of each motor 130 houses the operational components thereof, with an outer surface having a plurality of gear teeth 134. As outrunner motors 130, the teeth 134 are disposed on an exterior of the rotor (not separately illustrated) which rotates about a fixed stator (not shown) having a cover plate 138 and a central passage; the rotor being connected to a rotor shaft 136 extending through the central passage. In the present embodiment, the teeth 134 are formed by a cylindrical plastic gear press-fit around the motor body 132, although it is contemplated that the teeth 134 of each motor 130 could be differently formed. It is also contemplated that the shafts 136 could be omitted in some embodiments.

Figure 3:
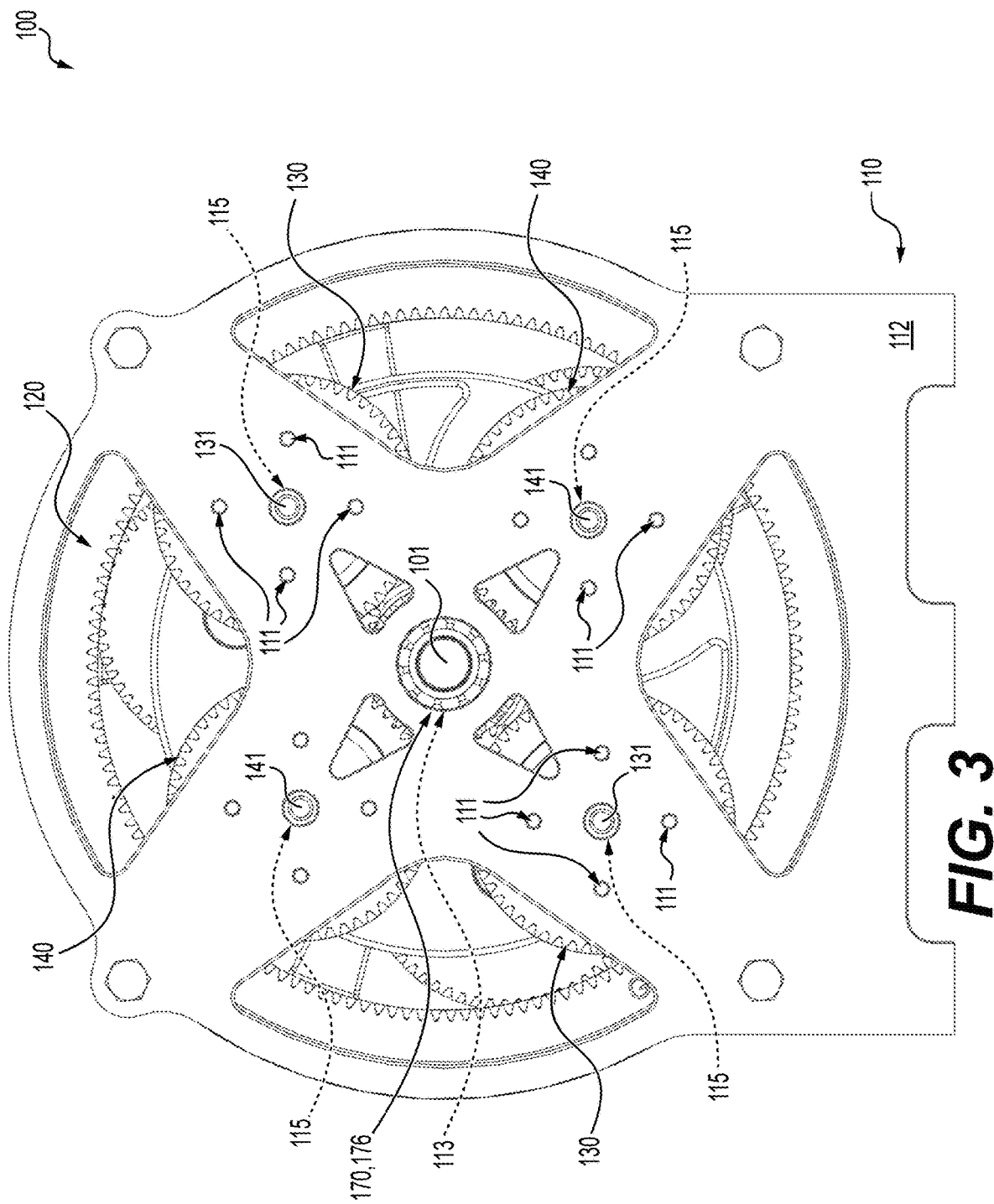
FIG. 3 is a front elevation view of the motor assembly of FIG. 1.
Figure 4:
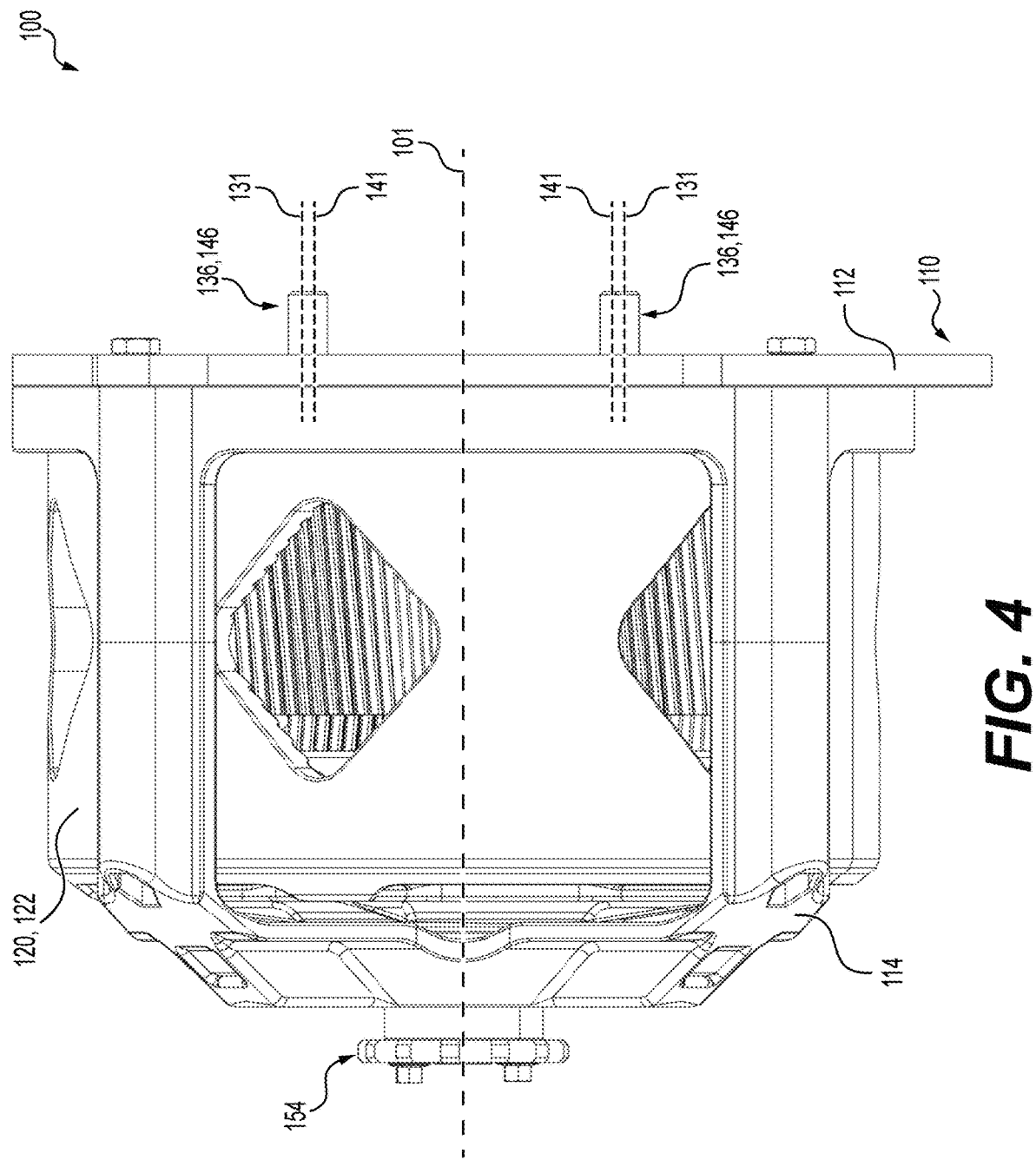
FIG. 4 is a side elevation view of the motor assembly of FIG. 1.
Figure 5:
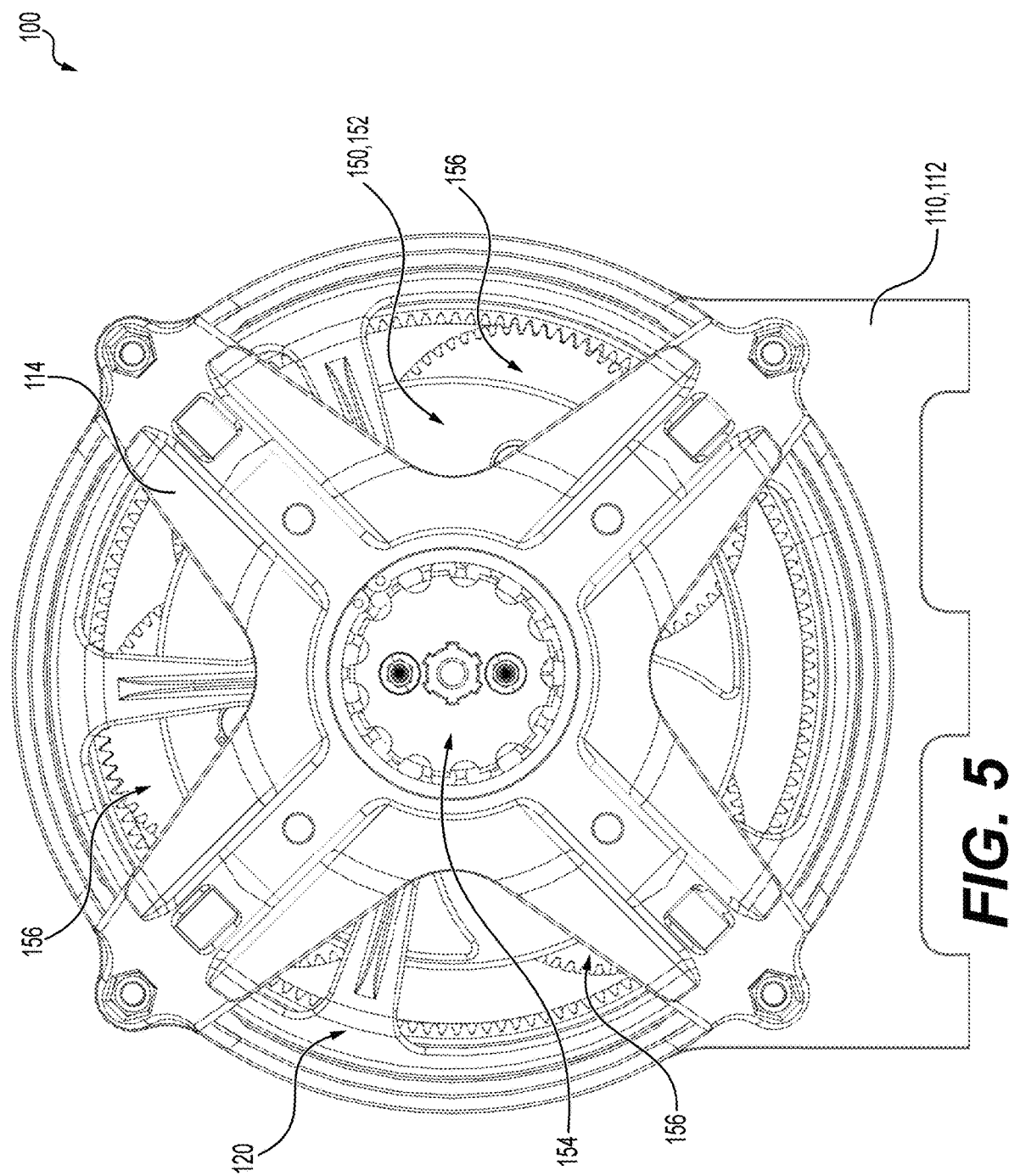
FIG. 5 is a rear elevation view of the motor assembly of FIG. 1.
Figure 6:
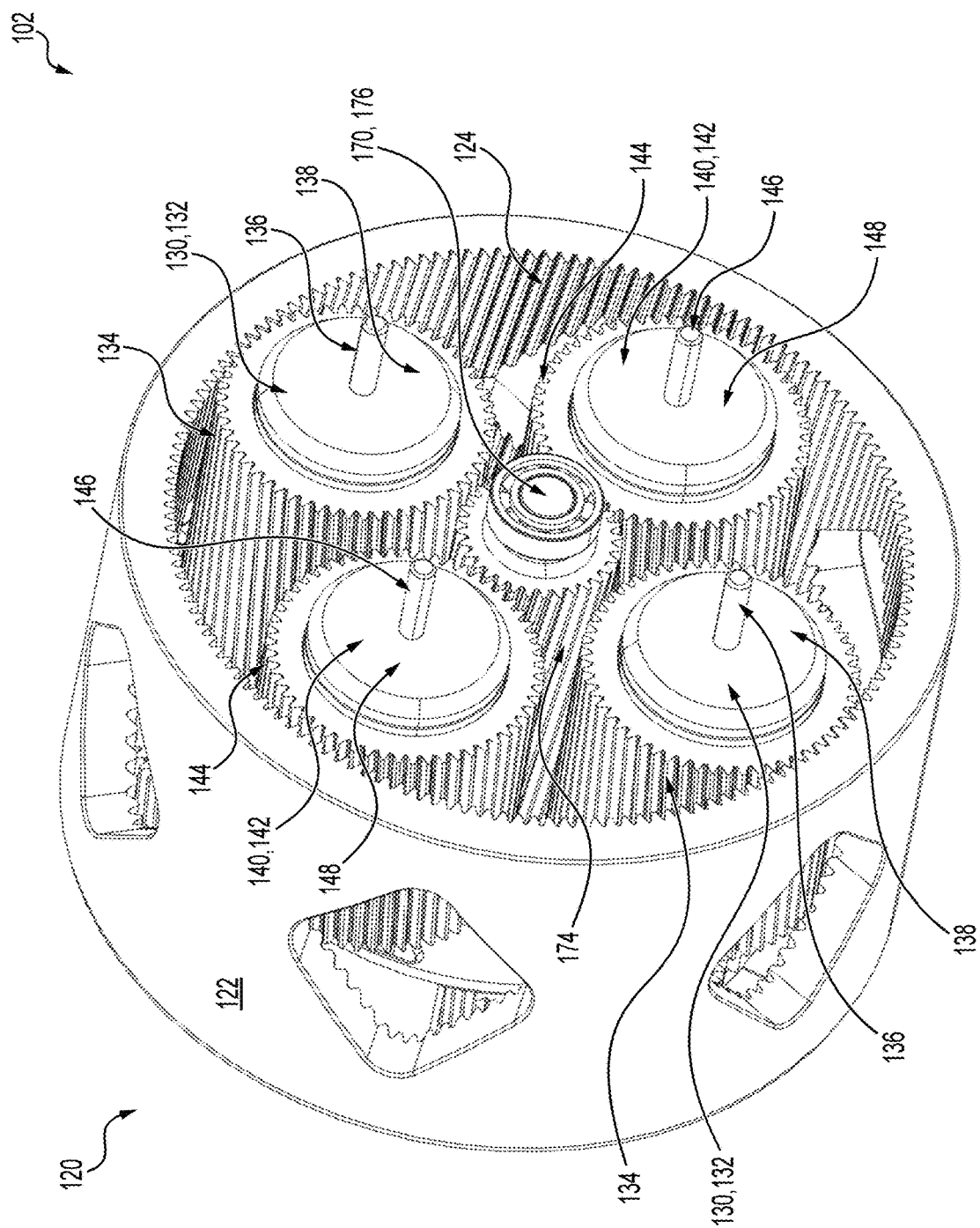
FIG. 6 is a front, side perspective view of a subassembly of the motor assembly of FIG. 1, the subassembly being the motor assembly with a support frame thereof removed.
Figure 7:
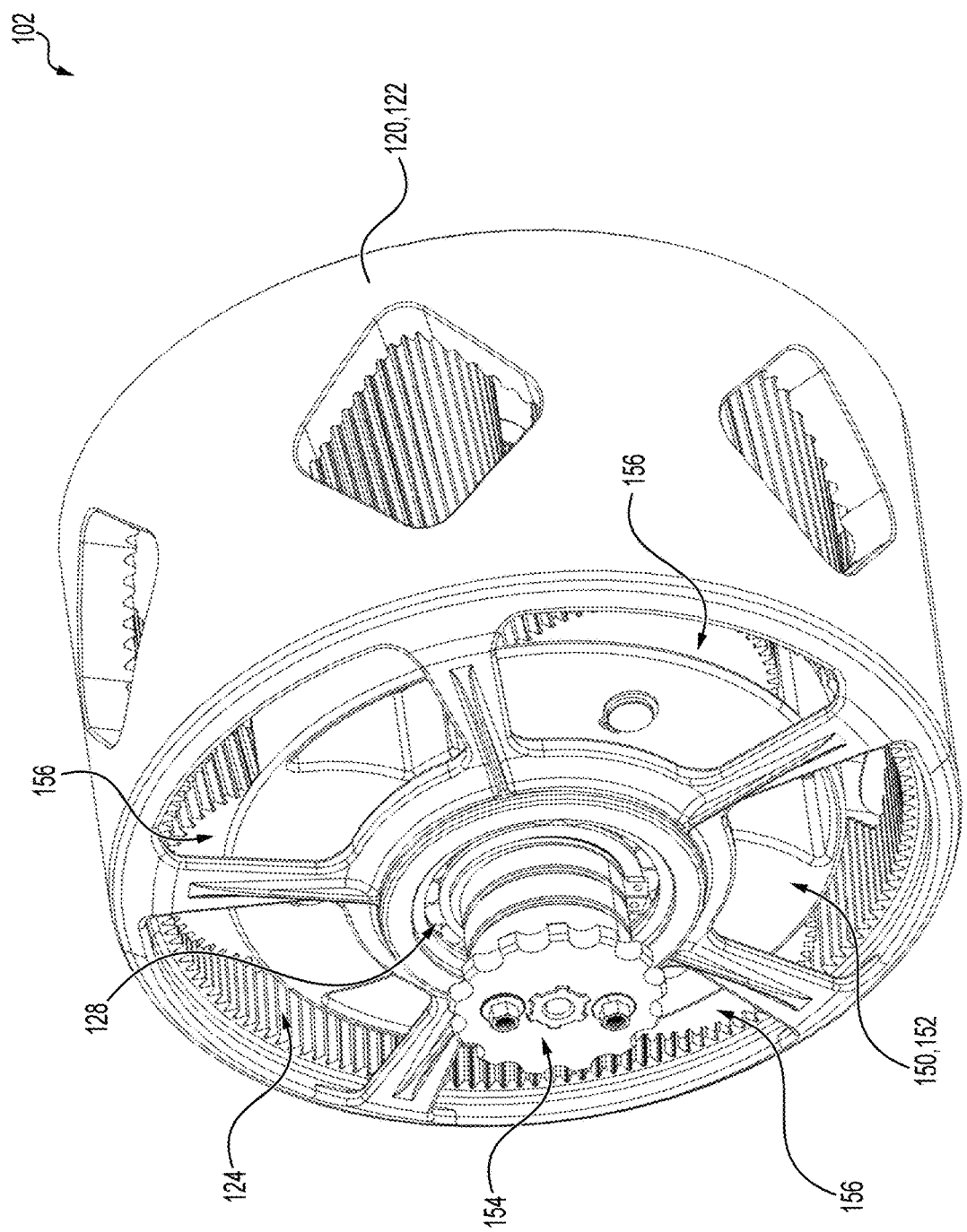
FIG. 7 is a rear, side perspective view of the subassembly of FIG. 6.

As can be seen from FIGS. 1 and 3, the faceplate 112 of the support frame 110 has defined therein openings, specifically shaft apertures 115 in the faceplate 112, for receiving the rotor shafts 136 therethrough. The stators are fixed to the faceplate 112 by fasteners, such as bolts (not shown) extending through openings 111 in the faceplate 112 and connecting to the cover plate 138 such that the rotor shafts 136 extend through the apertures 115. In embodiments where the rotor shafts 136 are omitted, the shaft apertures 115 may also be omitted. The faceplate 112 also includes a plurality of apertures defined therein for receiving therethrough wires (not shown) of the motors 130 for communicatively and electrically connecting the motors 130 to a power source (not shown) and one or more controllers (not shown) for powering and controlling operation of the motors 130.

Figure 8:
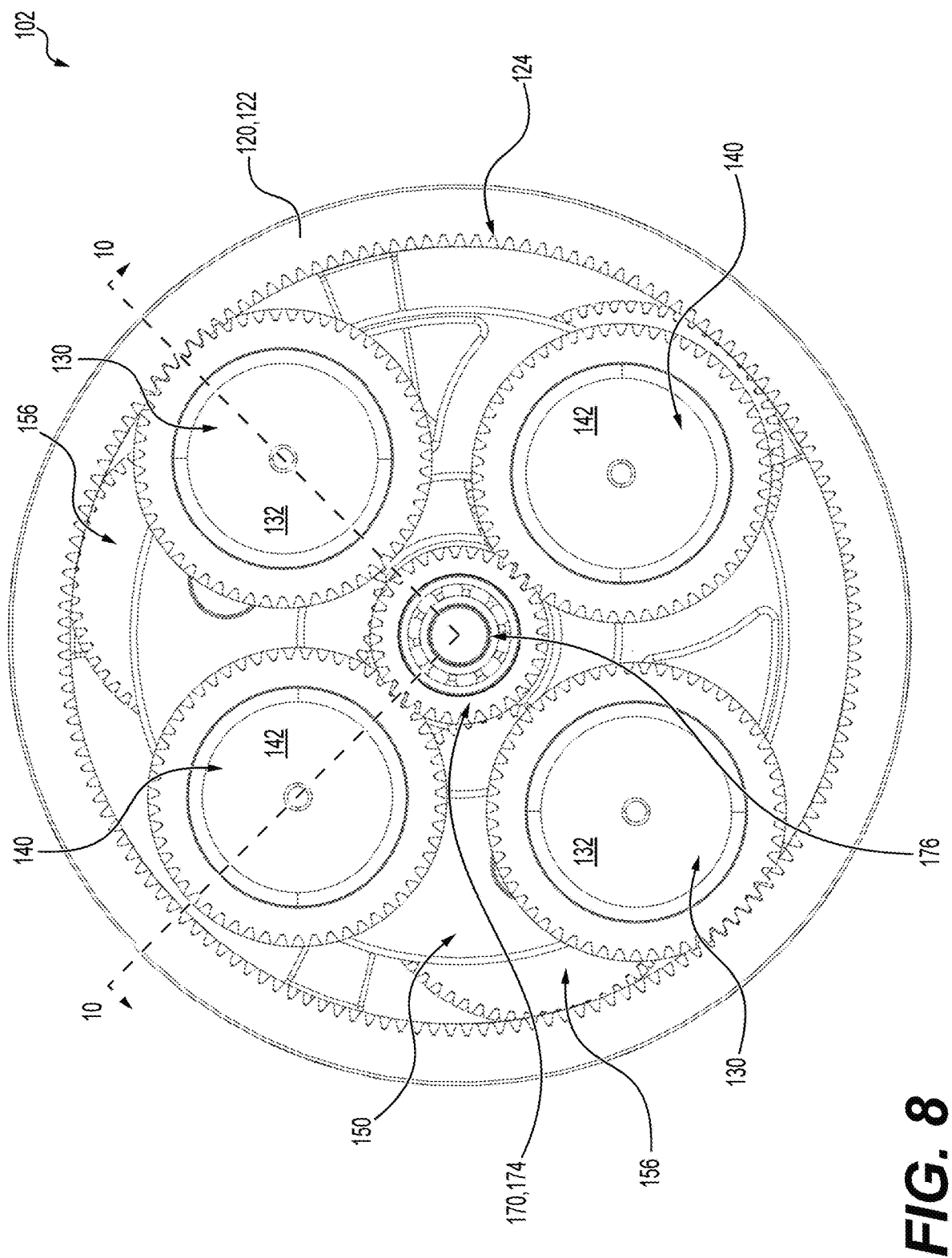
FIG. 8 is a front elevation view of the subassembly of FIG. 6.
Figure 9:
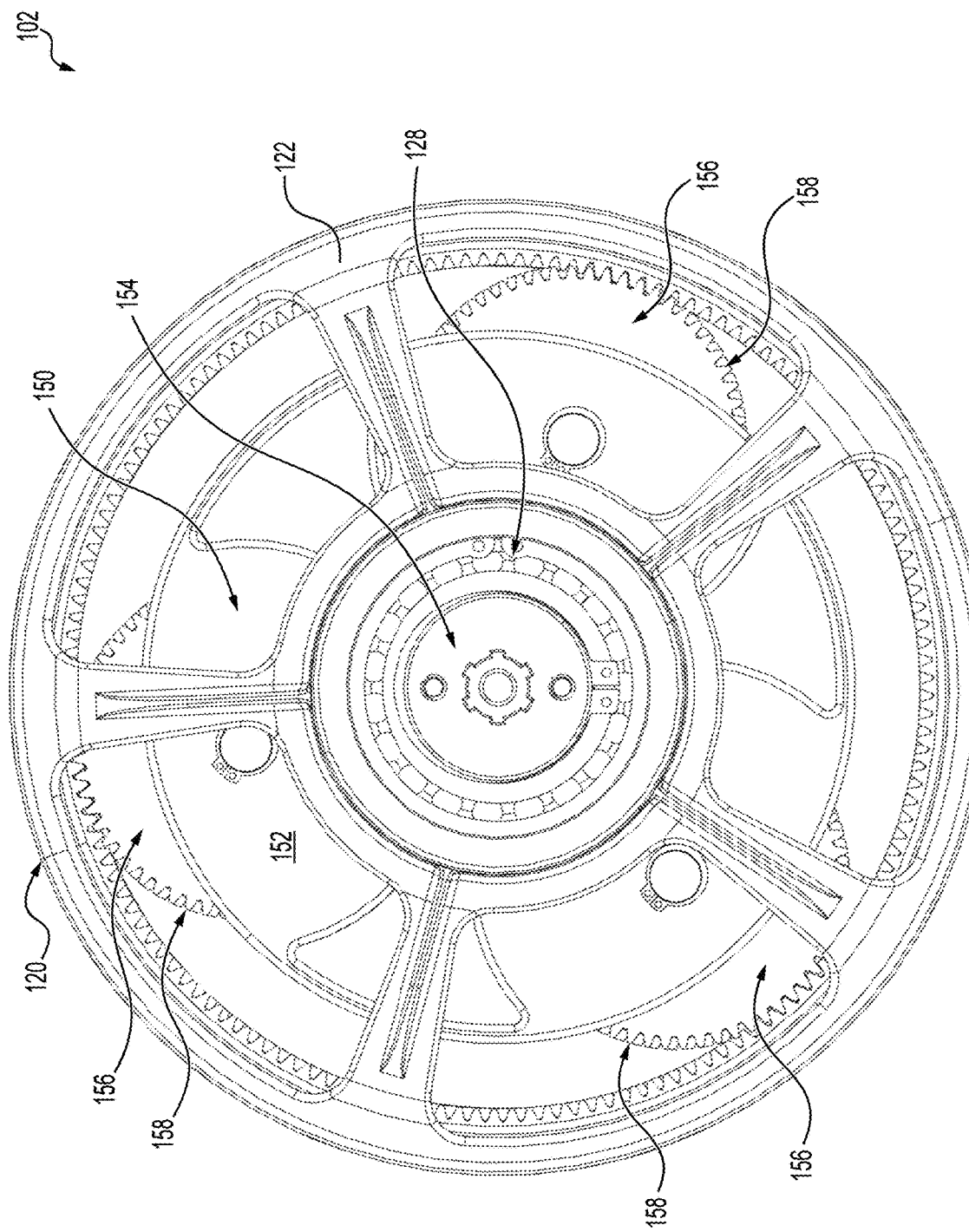
FIG. 9 is a rear elevation view of the subassembly of FIG. 6.

When in use, the exterior-disposed gear teeth 134 rotate about a motor axis 131 defined through a center of the shaft 136 (see FIGS. 3 and 4), with the center position of each motor 130 being fixed relative to the support frame 110 as noted above. As can be seen in FIG. 8, the motors 130 are positioned and arranged to drive the annulus gear 120, with the gear teeth 134 being engaged with the annulus gear teeth 124.

The assembly 100/subassembly 102 also includes a center gear 170 disposed in the interior of the annulus gear 120. Commonly referred to as a sun gear, the center gear 170 is disposed at a center of the annulus gear 120. The center gear 170 has a center gear body 172 rotationally supported by the support frame 110 and a carrier 150 of the assembly 100 (described below). A plurality of center gear teeth 174 are disposed on an outer surface of the center gear body 172 for engaging with other components of the assembly 100. An axis of rotation (not separately labeled) of the center gear 170 is coaxial with the center rotation axis 101.

The center gear 170 also includes a front bearing 176 (see FIGS. 10, 11) operatively connected to the center gear body 172 for rotationally connecting to the faceplate 112. As can be seen in FIGS. 1 and 3, the faceplate 112 has a center aperture 113 for supporting the center gear 170. In the present embodiment, the front bearing 176 is disposed in the center aperture 113 for rotationally supporting a front end portion of the center gear 170, with the center gear 170 freely rotating relative to the faceplate 112. The center gear 170 further includes two rear bearings 177, 178 operatively connected to the center gear body 172 for rotationally supporting a rear end portion of the center gear 170, described in more detail below. In some embodiments, the center gear 170 could include only one rear bearing or be arranged with a different support structure.

The assembly 100/subassembly 102 further includes one or more electric motors 140 for driving rotation of the center gear 170, referred to herein as hub motors 140 or sun motors 140. In the present embodiment, two hub motors 140 are disposed in an interior of the annulus gear 120 and the support frame 110. It is contemplated that in some embodiments, only one hub motor 140 could be included. It is also contemplated that more than two hub motors 140 could be included.

Similarly to the ring motors 130, the two hub motors 140 are specifically two outrunner electric motors 140. A main body 142 of each motor 140 houses the operational components thereof, with an outer surface having a plurality of gear teeth 144. As outrunner motors 140, the teeth 144 are disposed on an exterior of the rotor (not separately illustrated) which rotates about a fixed stator (not shown) having a cover plate 148 and a central passage; the rotor being connected to a rotor shaft 146 extending through the central passage. In the present embodiment, the teeth 144 are formed by a cylindrical plastic gear press-fit around the motor body 142, although it is contemplated that the teeth 144 of each motor 140 could be differently formed. It is also contemplated that the shafts 146 could be omitted in some embodiments.

The stators are fixed to the faceplate 112 by fasteners, such as bolts (not shown) extending through openings 111 in the faceplate 112 and connecting to the cover plate 148 such that the rotor shafts 146 extend through the apertures 115. In embodiments where the rotor shafts 146 are omitted, as well as the rotor shafts 136, the apertures 115 may also be omitted. The faceplate 112 also includes a plurality of apertures defined therein for receiving therethrough wires (not shown) of the motors 140 for communicatively and electrically connecting the motors 140 to a power source (not shown) and one or more controllers (not shown) for powering and controlling operation of the motors 140. It is also contemplated that one or more controllers could be disposed within the frame 110, in spaces between the motors 130, 140.

When in use, the exterior-disposed gear teeth 144 rotate about a motor axis 141 defined through a center of the shaft 146 (see FIGS. 3 and 4), with the center position of each motor 140 being fixed relative to the support frame 110 as noted above. As can be seen in FIG. 8, the motors 140 are positioned and arranged to drive the center gear 170, with the gear teeth 144 being engaged with the center gear teeth 174.

With continued reference to FIG. 8, the relative arrangement of the ring motors 130 and the hub motors 140 is illustrated. The ring motors 130 and the hub motors 140 are disposed around the center gear 170, with the rotation axis 131, 141 of each motor 130, 140 being positioned parallel to the center rotation axis 101 (see also FIG. 4). In the present embodiment, the motors 130, 140 are arranged in an alternation sequence; specifically each ring motor 130 is disposed between the two hub motors 140 angularly about the center axis 101 and vice versa. The ring motors 130 are thus oppositely disposed about the center gear 170. The hub motors 140 are similarly oppositely disposed about the center gear 170. It is contemplated that the specific placement of the motors 130, 140 could vary in different embodiments.

The assembly 100 further includes a carrier 150 for converting and combining motion from the motors 130, 140, via the annulus gear 120 and the center gear 170. The carrier 150 includes a carrier body 152 defining the output shaft 154, the output shaft 154 being configured and arranged for operatively connecting to a drivetrain of the vehicle in which the motor assembly 100 is installed. A main portion of the carrier body 152 is disposed in the interior of the annulus gear 120 and inside the support frame 110. The output shaft 154 extends from the interior of the annulus gear 120, through the bearing 128 in the rear support structure 126, through the bearing 116 of the cage 114, and out of the support frame 110. In some embodiments, more of the carrier 150 could be disposed on an exterior of the annulus gear 120. The particular arrangement of the carrier 150 and the annulus gear 120 is contemplated to vary depending on the specific embodiment.

Figure 12:
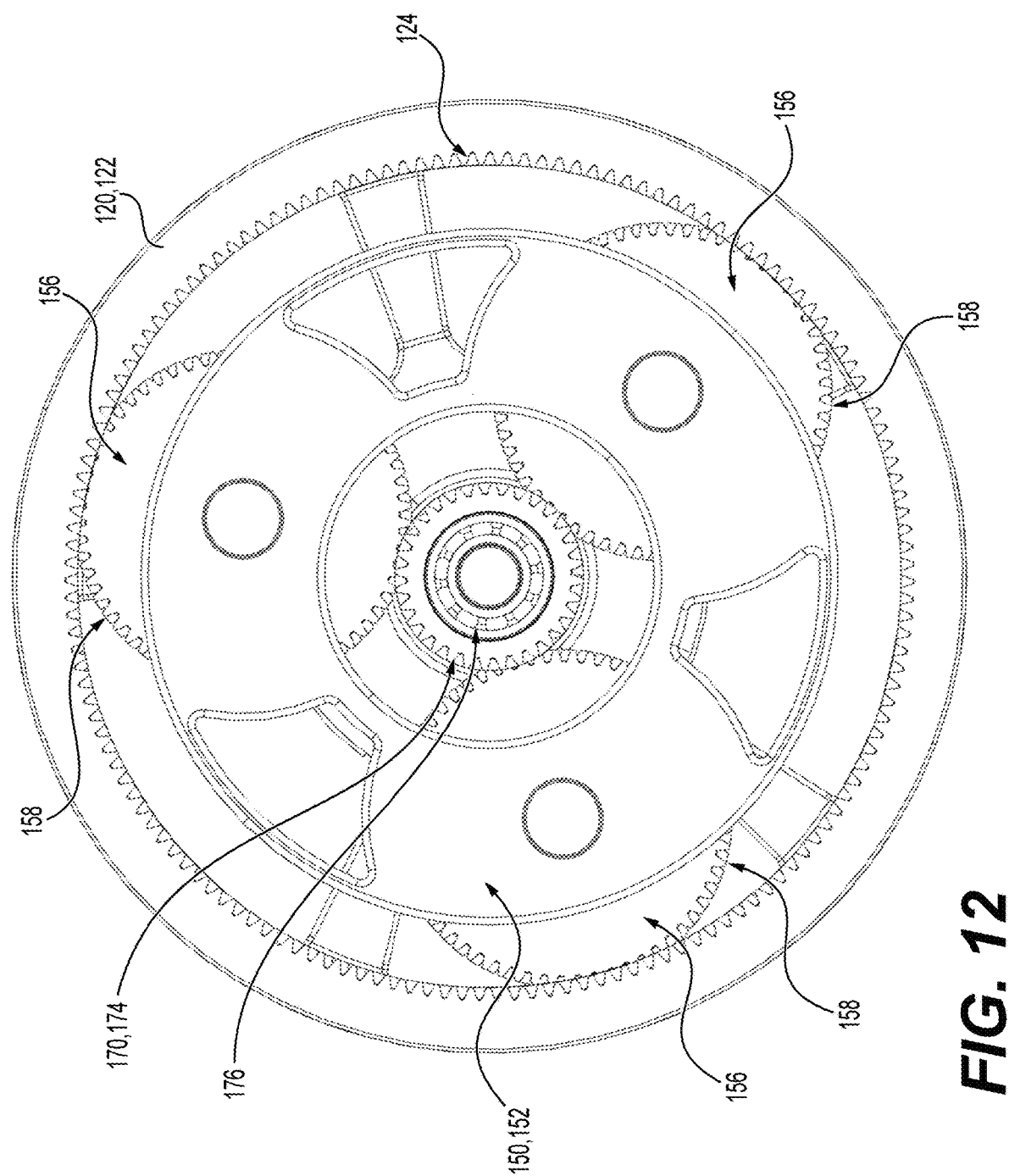
FIG. 12 is a front elevation view of components of the subassembly of FIG. 6, with motors being removed.

The carrier 150 includes a plurality of carrier gears 156 rotationally connected to the carrier body 152. In the present embodiment, the carrier 150 includes three carrier gears 156. It is contemplated that the carrier 150 could include more or fewer gears in different embodiments. The carrier gears 156 each include a plurality of gear teeth 158 for operatively connecting the carrier 150 to the annulus gear 120 and the center gear 170. As is further illustrated in FIG. 12, the carrier gear teeth 158 are engaged with the center gear teeth 174 and the annulus gear teeth 124.

Figure 10:
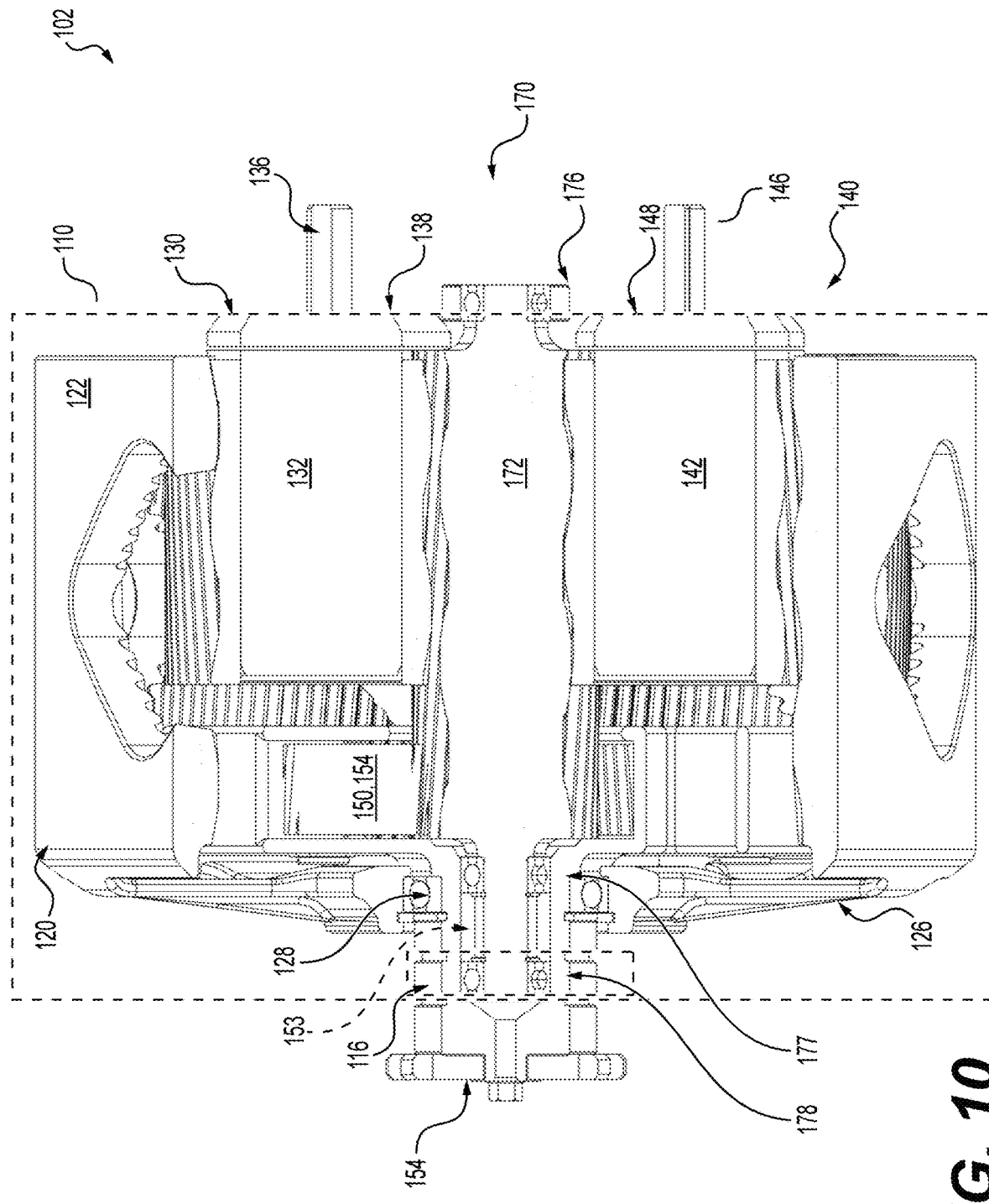
FIG. 10 is a partial cross-sectional view of the subassembly of FIG. 6, taken along line 10-10 of FIG. 8.
Figure 11:
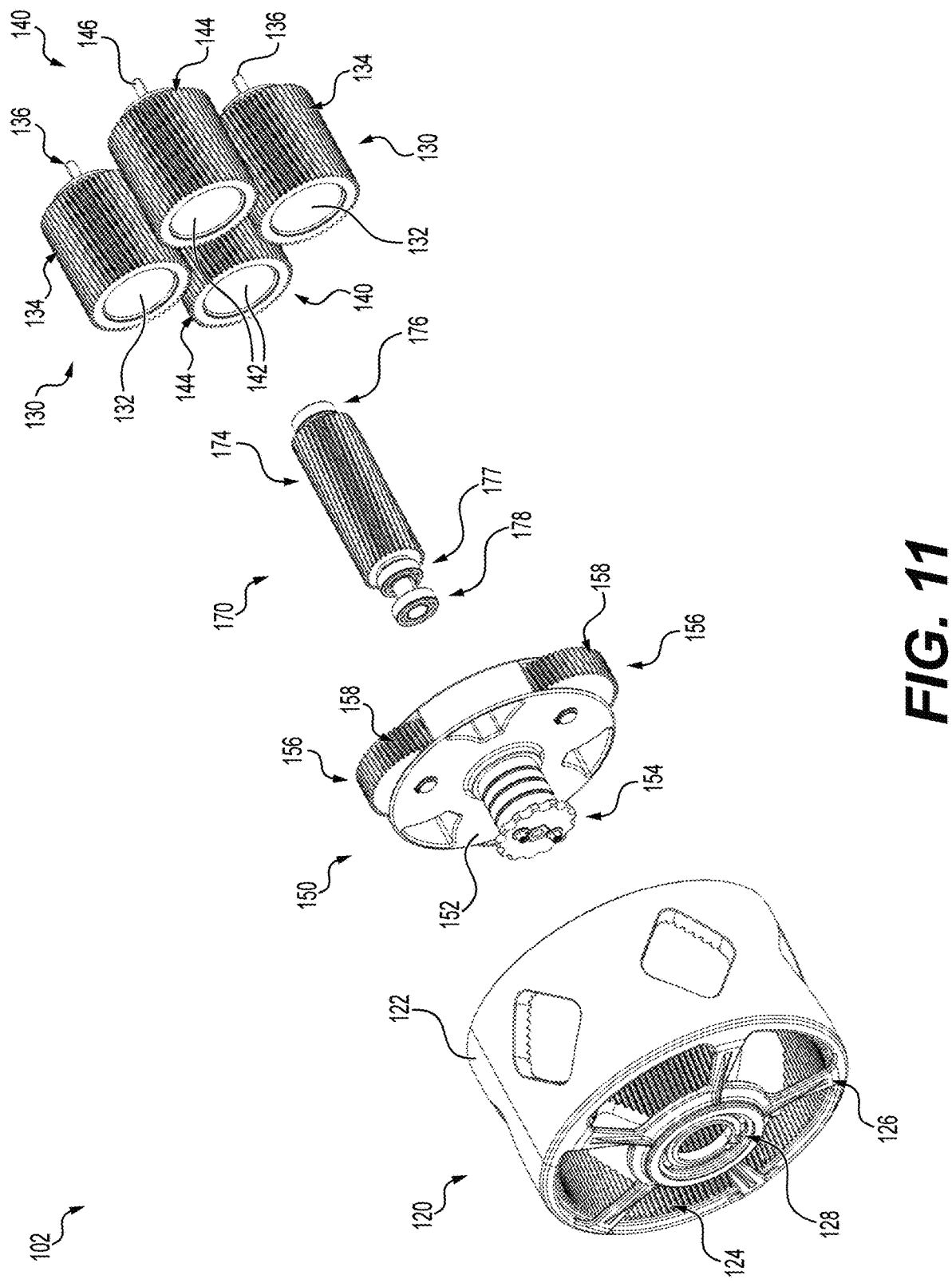
FIG. 11 is an exploded, rear, side perspective view of the subassembly of FIG. 6.

The center gear 170, specifically the rear end portion thereof, is received in a cavity 153 formed by the carrier body 152. As can be seen in FIG. 10, the bearings 177, 178 of the center gear 170 are press fit into the cavity 153 such that the rear end portion of the center gear 170 is supported by the carrier body 152 while being arranged to rotate freely relative thereto. It is contemplated that the center gear 170 and the carrier body 152 could be different connected.

As can be seen in FIG. 10, the subassembly 102 is rotationally supported by the support frame 110 (shown schematically in FIG. 10), such that the annulus gear 120, the carrier 150, and the center gear 170 are arranged to freely rotate relative to the support frame 110. Specifically, the output shaft 154, and thus the carrier 150, is supported by the cage 114 of the support frame 110 via the bearing 116. A front portion of the center gear 170 is supported by the faceplate 112 via the bearing 174 of the center gear 170. As the rear portion of the center gear 170 is received in the carrier 150, the center of the subassembly 102 is thus supported by, but freely rotates relative to, the support frame 110. The annulus gear 120 is supported in turn via the bearing 128 rotatively connecting the annulus gear 120 to the carrier body 154.

As the carrier 150 is operatively coupled to the annulus gear 120 and the center gear 170, the motion and speed of the motors 130, 140 can be combined to produce a wide variety of output torques and speeds at the output shaft 154. When in use, rotation of the ring motors 130 causes rotation of the annulus gear 120 and rotation of the hub motors 140 causes rotation of the center gear 170. Rotation of the annulus gear 120 and the center gear 170 in turn drives rotation of the carrier 150 through engagement of the carrier gears 156 therewith, in combination with the free rotation of the carrier 150 relative to the support frame 110. As with standard planetary drive gear arrangements, the speed and direction of rotation of the carrier 150, and thus the output shaft 154 in the present technology, depends on the speed and direction of the motors 130, 140. While the two ring motors 130 need to turn in a same direction, and similarly the two hub motors 140 must turn in a same direction, it is noted that the ring motors 130 could rotate in a direction opposite to the hub motors 140.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A motor assembly comprising:
   an annulus gear comprising:
      an annulus gear body having a hollow cylindrical form, and
      a plurality of annulus gear teeth disposed on an inner surface of the annulus gear body, the annulus gear rotating about a center rotation axis;
   at least one first motor disposed in an interior of the annulus gear, the at least one first motor being an outrunner electric motor rotating about a first motor axis, the first motor axis being parallel to the center rotation axis, the at least one first motor being arranged to drive the annulus gear;
   a carrier disposed at least partially in the interior of the annulus gear, the carrier comprising:
      a carrier body defining an output shaft, and
      a plurality of carrier gears rotationally connected to the carrier body, gear teeth of the plurality of carrier gears being engaged with the plurality of annulus gear teeth;
   a center gear disposed in the interior of the annulus gear, the center gear comprising:
      a center gear body, and
      a plurality of center gear teeth disposed on an outer surface of the center gear body,
   a rotation axis of the center gear being coaxial with the center rotation axis, the gear teeth of the plurality of carrier gears being engaged with the plurality of center gear teeth; and
   at least one second motor disposed in the interior of the annulus gear, the at least one second motor being an outrunner electric motor rotating about a second motor axis, the second motor axis being parallel to the center rotation axis, the at least one second motor being arranged to drive the center gear.

2. The motor assembly of claim 1, wherein:
   the at least one first motor being arranged to drive the annulus gear via at least one first gear; and
   the at least one second motor being arranged to drive the center gear via at least one second gear.

3. The motor assembly of claim 2, wherein:
   the at least one first gear is formed by an outer surface of the at least one first motor having a plurality of first gear teeth, the plurality of first gear teeth being engaged with the plurality of annulus gear teeth; and
   the at least one second gear is formed by an outer surface of the at least one second motor having a plurality of second gear teeth, the plurality of second gear teeth being engaged with plurality of center gear teeth.

4. The motor assembly of claim 3, wherein:
   the plurality of first gear teeth is formed from plastic; and
   the plurality of second gear teeth is formed from plastic.

5. The motor assembly of claim 1, wherein, when in use:
   rotation of the at least one first motor causes rotation of the annulus gear; and
   rotation of the at least one second motor causes rotation of the center gear.

6. The motor assembly of claim 1, wherein the at least one first motor includes:
   a first ring motor engaged with the annulus gear; and
   a second ring motor engaged with the annulus gear.

7. The motor assembly of claim 6, wherein the first ring motor and the second ring motor are oppositely disposed about the center gear.

8. The motor assembly of claim 6, wherein the at least one second motor includes:
   a first hub motor engaged with the center gear; and
   a second hub motor engaged with the center gear.

9. The motor assembly of claim 8, wherein the first ring motor, the second ring motor, the first hub motor, and the second hub motor are disposed around the center gear.

10. The motor assembly of claim 8, wherein:
    the first ring motor is disposed angularly between the first hub motor and the second hub motor; and
    the second ring motor is disposed angularly between the second hub motor and the first hub motor.

11. The motor assembly of claim 1, wherein the at least one second motor includes:
    a first hub motor engaged with the center gear; and
    a second hub motor engaged with the center gear.

12. The motor assembly of claim 1, further comprising:
    a support frame; and
    wherein:

the annulus gear is arranged to freely rotate relative to the support frame, and a center position of the at least one first motor and a center position the at least one second motor is fixed relative to the support frame.

13. The motor assembly of claim 12, wherein:

the annulus gear is surrounded by the support frame; and the output shaft of the carrier extends through and out of the support frame.

14. The motor assembly of claim 13, wherein the support frame includes a bearing, the output shaft extending through and being supported by the bearing.

15. The motor assembly of claim 12, wherein:

a stator shaft of the at least one first motor is rotationally fixed relative to the support frame; and a stator shaft of the at least one second motor is rotationally fixed relative to the support frame.

16. The motor assembly of claim 15, wherein:

the stator shaft of the at least one first motor extends through at least one first opening in the support frame, the support frame preventing movement of the center position of the at least one first motor at least in part by contact of the stator shaft with the at least one first opening; and the stator shaft of the at least one second motor extends through at least one second opening in the support frame, the support frame preventing movement of the center position of the at least one second motor at least in part by contact of the stator shaft with the at least one second opening.

17. The motor assembly of claim 1, wherein the plurality of carrier gears includes three carrier gears.

18. The motor assembly of claim 1, wherein:

the at least one first motor is a plurality of ring motors engaged with the annulus gear, and the at least one second motor is a plurality of hub motors engaged with the center gear.

* * * * *

UNITED STATES PATENT AND TRADEMARK OFFICE
CERTIFICATE OF CORRECTION

| | |
|---|---|
| PATENT NO. | : 12,289,033 B2 |
| APPLICATION NO. | : 18/818772 |
| DATED | : April 29, 2025 |
| INVENTOR(S) | : Gerhard Hofer et al. |

Page 1 of 1

It is certified that error appears in the above-identified patent and that said Letters Patent is hereby corrected as shown below:

In the Specification

In Column 2, Lines 27, "of second gear teeth being engaged with plurality of center" should read --of second gear teeth being engaged with the plurality of center--

In the Claims

In Claim 3, Column 8, Line 33, "being engaged with plurality of center gear teeth" should read --being engaged with the plurality of center gear teeth--

Signed and Sealed this
Third Day of June, 2025

Coke Morgan Stewart
*Acting Director of the United States Patent and Trademark Office*